(12) United States Patent
Jiang et al.

(10) Patent No.: US 11,109,185 B2
(45) Date of Patent: Aug. 31, 2021

(54) MESH NETWORK AND MESH DEVICE AND NETWORK DISTRIBUTION METHOD THEREOF

(71) Applicant: Espressif Systems (Shanghai) Co., Ltd., Shanghai (CN)

(72) Inventors: Jiangjian Jiang, Shanghai (CN); Yuexia Qi, Shanghai (CN)

(73) Assignee: Espressif Systems (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 16/635,060

(22) PCT Filed: Jan. 8, 2019

(86) PCT No.: PCT/CN2019/070739
§ 371 (c)(1),
(2) Date: Jan. 29, 2020

(87) PCT Pub. No.: WO2019/149036
PCT Pub. Date: Aug. 8, 2019

(65) Prior Publication Data
US 2020/0359169 A1 Nov. 12, 2020

(30) Foreign Application Priority Data
Feb. 1, 2018 (CN) .......................... 201810100645.0

(51) Int. Cl.
*H04W 84/18* (2009.01)
*H04W 4/02* (2018.01)
(Continued)

(52) U.S. Cl.
CPC ......... *H04W 4/023* (2013.01); *H04L 41/0806* (2013.01); *H04W 4/80* (2018.02); *H04W 12/50* (2021.01); *H04W 84/18* (2013.01)

(58) Field of Classification Search
CPC ......... H04W 4/023; H04W 4/38; H04W 4/80; H04W 4/50; H04W 8/005; H04W 84/18;
(Continued)

(56) References Cited

U.S. PATENT DOCUMENTS 10,182,327 B2 * 1/2019 Kwon .................... H04W 4/80
10,219,166 B2 * 2/2019 Friday ................... H04W 4/80
(Continued)

FOREIGN PATENT DOCUMENTS

CN          101848461 A          9/2010
CN          105376833 A          3/2016
(Continued)

*Primary Examiner* — Jean A Gelin
(74) *Attorney, Agent, or Firm* — Reinhart Boerner Van Deuren P.C.

(57) ABSTRACT

Disclosed in the present invention is a method for provisioning a mesh network, the provisioning method comprising: a mobile terminal scans one or more mesh devices within a preset distance range thereof; the mobile terminal communicatively connects with the one or more mesh devices and sends mesh network configuration information to the one or more mesh devices, and the one or more mesh devices completes the provisioning. In the present invention, the mobile terminal can directly input mesh network configuration information and implement mesh provisioning for a plurality of mesh devices or all the mesh devices in the communication range thereof through Bluetooth; the speed is high, operation is simple, and efficiency is high.

10 Claims, 3 Drawing Sheets

(51) Int. Cl.
*H04W 4/80* (2018.01)
*H04L 12/24* (2006.01)
*H04W 12/50* (2021.01)

(58) Field of Classification Search
CPC .............. H04W 52/02; H04L 41/0806; H04L 63/1416; H04L 61/1466; H04L 41/0813; H04L 41/0823; H04L 41/085
See application file for complete search history.

(56) References Cited

U.S. PATENT DOCUMENTS

| | | | | |
|---|---|---|---|---|
| 2005/0282494 A1* | 12/2005 | Kossi | ............ | H04W 88/06 455/41.2 |
| 2007/0298721 A1* | 12/2007 | Mishra | ............ | H04W 72/082 455/66.1 |
| 2008/0031203 A1* | 2/2008 | Bill | ............ | H04W 4/50 370/338 |
| 2008/0192713 A1* | 8/2008 | Mighani | ............ | H04W 84/00 370/338 |
| 2009/0047924 A1* | 2/2009 | Ray | ............ | H04M 11/04 455/404.2 |
| 2009/0147702 A1* | 6/2009 | Buddhikot | ............ | H04L 67/34 370/255 |
| 2011/0013606 A1* | 1/2011 | Seok | ............ | H04W 8/005 370/338 |
| 2014/0049364 A1* | 2/2014 | Ahearn | ............ | G07C 9/00174 340/5.51 |
| 2015/0109961 A1* | 4/2015 | Patil | ............ | H04W 4/21 370/254 |
| 2015/0120094 A1* | 4/2015 | Kimchi | ............ | G05D 1/00 701/3 |
| 2015/0245351 A1* | 8/2015 | Banerjea | ............ | H04H 20/71 370/338 |
| 2016/0014669 A1* | 1/2016 | Patil | ............ | H04W 40/246 370/329 |
| 2016/0021688 A1* | 1/2016 | Panah | ............ | H04W 8/005 370/338 |
| 2016/0128108 A1* | 5/2016 | Saija | ............ | H04W 4/50 370/254 |
| 2016/0134691 A1* | 5/2016 | Law | ............ | H04L 67/1097 370/338 |
| 2016/0142252 A1* | 5/2016 | Garg | ............ | H04W 12/08 455/424 |
| 2016/0191642 A1* | 6/2016 | Acar | ............ | H04W 4/80 455/41.2 |
| 2016/0226707 A1* | 8/2016 | Schallich | ............ | H04L 65/1069 |
| 2016/0241660 A1* | 8/2016 | Nhu | ............ | H04L 67/26 |
| 2016/0278739 A1* | 9/2016 | Pelissier | ............ | A61B 8/461 |
| 2017/0070436 A1* | 3/2017 | Lubenski | ............ | H04W 28/0205 |
| 2017/0180062 A1* | 6/2017 | Johansen | ............ | H04W 76/27 |
| 2017/0280495 A1* | 9/2017 | Zhang | ............ | H04W 76/23 |
| 2018/0063714 A1* | 3/2018 | Stephenson | ............ | H04W 8/005 |
| 2018/0116042 A1* | 4/2018 | Roosli | ............ | H05B 47/155 |
| 2018/0330601 A1* | 11/2018 | Sabolcik | ............ | H04W 84/18 |
| 2018/0343200 A1* | 11/2018 | Jana | ............ | H04L 45/02 |
| 2018/0343685 A1* | 11/2018 | Hart | ............ | H04W 24/02 |
| 2018/0343701 A1* | 11/2018 | Ma | ............ | H04W 28/0268 |
| 2019/0037419 A1* | 1/2019 | Knaappila | ............ | H04W 52/0212 |
| 2019/0045558 A1* | 2/2019 | Zhang | ............ | H04L 61/2007 |
| 2019/0200193 A1* | 6/2019 | Bae | ............ | H04W 8/005 |
| 2020/0107332 A1* | 4/2020 | Huang | ............ | H04W 48/14 |
| 2020/0169572 A1* | 5/2020 | Jana | ............ | H04W 12/0471 |
| 2020/0413510 A1* | 12/2020 | Krattiger | ............ | G01R 23/15 |
| 2021/0044971 A1* | 2/2021 | Pandey | ............ | H04W 12/037 |

FOREIGN PATENT DOCUMENTS

| | | |
|---|---|---|
| CN | 105451300 A | 3/2016 |
| CN | 106211264 A | 12/2016 |
| CN | 106230671 A | 12/2016 |
| CN | 106600935 A | 4/2017 |
| CN | 107889119 A | 4/2018 |
| CN | 108199905 A | 6/2018 |

* cited by examiner

MESH NETWORK AND MESH DEVICE AND NETWORK DISTRIBUTION METHOD THEREOF

TECHNICAL FIELD

The present invention relates to a provisioning technology, in particular to a mesh network, a mesh device and a provisioning method thereof.

BACKGROUND ART

With the rapid development of Internet of Things technology, intelligent devices are becoming more and more popular, especially intelligent household appliances. As a part of intelligent devices, Wi-Fi modules play a vital role in remote control function of intelligent devices. The provisioning is the first problem to be solved for intelligent devices. The first-time provisioning for intelligent devices is actually the provisioning for a Wi-Fi module inside the intelligent devices. In brief, this process is to initialize the Wi-Fi module and connect it to a wireless router at home.

At present, there are two popular Wi-Fi provisioning modes:

The first is a SoftAP mode based on Wi-Fi module: place a mobile phone in a Station mode, and then the mobile phone connects to an AP enabled on an intelligent device, the mobile phone and the intelligent device forming a LAN. Then the mobile phone may send to the intelligent device an SSID and a password of the router to be connected, and then the intelligent device may actively connect to the router to complete the connection.

The second is a Sniffer mode based on Wi-Fi module: place an intelligent device in a hybrid mode, monitoring all messages in the network. An APP on the mobile phone may code the SSID and password into a UDP message, sends the UDP message through broadcasting or multicasting; and when the intelligent device receives the UDP message, it decodes the UDP message to get the correct SSID and password, and then actively connects to the router corresponding to the SSID to complete the connection.

Regarding the traditional one-key configuration (smartconfig), SoftAP provisioning, Bluetooth provisioning, etc., they provide low provisioning speed and poor security; and they seem incapable when encountering the demand for provisioning hundreds of intelligent devices. Their main shortcomings are as follows:

1) Poor user experience: SoftAP-based mode can ensure successful configuration, but the user experience is not friendly; because it requires a mobile phone to be connected to SoftAP first, whether manually (iOS) or automatically (Android), and then switch back after the configuration is completed. In this process, the mobile phone will disconnect from the router which is already connected thereto and lose the connection to the Internet.

2) Insecure, low success rate: although the intelligent configuration is convenient, there is still a certain probability of failure in the case of complex Wi-Fi environment. A mobile phone should transmit a password of a router to a Wi-Fi module. If the password is cleartext, it may be easily intercepted, which brings great security risk to the Wi-Fi network.

3) Low speed: when using SoftAP and the intelligent configuration for provisioning, each device needs to interact with a cloud end one by one and complete the operation such as binding, the provisioning time usually takes about 10 seconds; when the number of intelligent devices is as high as hundreds, conventional Wi-Fi mesh technologies may complete provisioning for all devices in dozens of minutes.

SUMMARY OF THE INVENTION

The present invention provides a mesh network, a mesh device and a provisioning method therefor, which is simple to operate and provides high efficiency of provisioning.

To achieve the above object, the present invention provides a method for provisioning a mesh network, the method comprising:

a mobile terminal scanning one or more mesh devices within a preset distance range thereof;

the mobile terminal communicatively connecting with the one or more mesh devices and sending mesh network configuration information to the one or more mesh devices, and the one or more mesh devices completing provisioning.

Before the mobile terminal scans the one or more mesh devices, all mesh devices to be provisioned within the preset distance range activate Bluetooth, and the mobile terminal scans and communicatively connect with the one or more mesh devices through Bluetooth.

Before the mobile terminal sends the mesh network configuration information to the one or more mesh devices, the mobile terminal receives and/or edits the mesh network configuration information.

The mobile terminal sends the mesh network configuration information, sequentially or simultaneously, to all the mesh devices to be provisioned within the preset distance range.

The preset distance range is a coverage range of Bluetooth.

The mesh network configuration information includes an ID of the mesh network; an SSID, a channel and a password of a router; and a maximum number of connections supported by and a password of each SoftAP.

The present invention further provides a mesh network suitable for the above provisioning method, the mesh network comprising:

a mobile terminal which receives and/or edits mesh network configuration information and sends out the mesh network configuration information;

a plurality of mesh devices which communicatively connect with the mobile terminal and receive the mesh network configuration information to complete provisioning.

Each of the above mesh devices comprise a first Bluetooth module, which communicatively connects with the mobile terminal through Bluetooth.

The above mobile terminal comprises a mesh network configuration information receiving module and/or editing module, and a second Bluetooth module.

The present invention also provides a mesh device suitable for the above provisioning method, the mesh device comprising:

a first Bluetooth module which communicatively connects with the mobile terminal and receives the mesh network configuration information;

a mesh provisioning module which completes provisioning according to the mesh network configuration information.

Compared with the existing provisioning methods, the mesh network, the mesh device and the provisioning for a mesh network according to the invention have the advantages of being able to input the mesh network configuration information directly from the mobile terminal, and to implement provisioning for a plurality of mesh devices or all the mesh devices within the communication range thereof through Bluetooth, with high speed, simple operation, and high efficiency.

DETAILED DESCRIPTION OF THE PREFERRED EMBODIMENTS

In order to make the object, technical solution and advantages of the embodiments of the present invention clearer, the technical solution in the embodiments of the present invention will be described clearly and completely in connection with the drawings in the embodiments of the present invention. Obviously, the described embodiments are some rather than all of the embodiments of the present invention. Based on the embodiments of the present invention, all other embodiments obtained by a person of ordinary skills in the art without creative work shall fall into the protection scope of the present invention.

It should be noted that in the present disclosure, relational terms such as "first", "second", "third" are used only to distinguish one entity or operation from another entity or operation, without necessarily requiring or implying any such actual relationship or order between these entities or operations. It should be understood that the terms used in this way may be interchangeable where appropriate, such that the embodiments of the present invention described herein, for example, may be implemented in a sequence other than those illustrated or described herein. In addition, the term "including", "containing", "having" or any other variant thereof is intended to cover non-exclusive inclusion, so that a process, method, article or terminal device that includes a series of elements may include not only those elements, but may also include other elements that are not explicitly listed, or may include elements inherent in such processes, methods, articles or terminal device. In the absence of further restrictions, the elements limited by the statement "comprising . . . " or "include . . . " do not exclude the existence of additional elements in processes, methods, articles or terminal device that include said elements. In addition, in this disclosure, "greater than", "less than", "more than" is understood as excluding the number itself; and "above", "below", "within" is understood as including the number itself.

A wireless Mesh network, namely Wi-Fi mesh network, wireless mesh network, also known as "multi-hop" network, is a new wireless network technology completely different from a traditional wireless network. Wireless mesh network is a new network structure based on multi-hop routing and peer-to-peer network technology, which has the characteristic of mobile broadband, and at the same time, it may continuously expand in a dynamic manner, and be able of self-networking, self-management, self-healing, and self-balancing.

Figure 1:
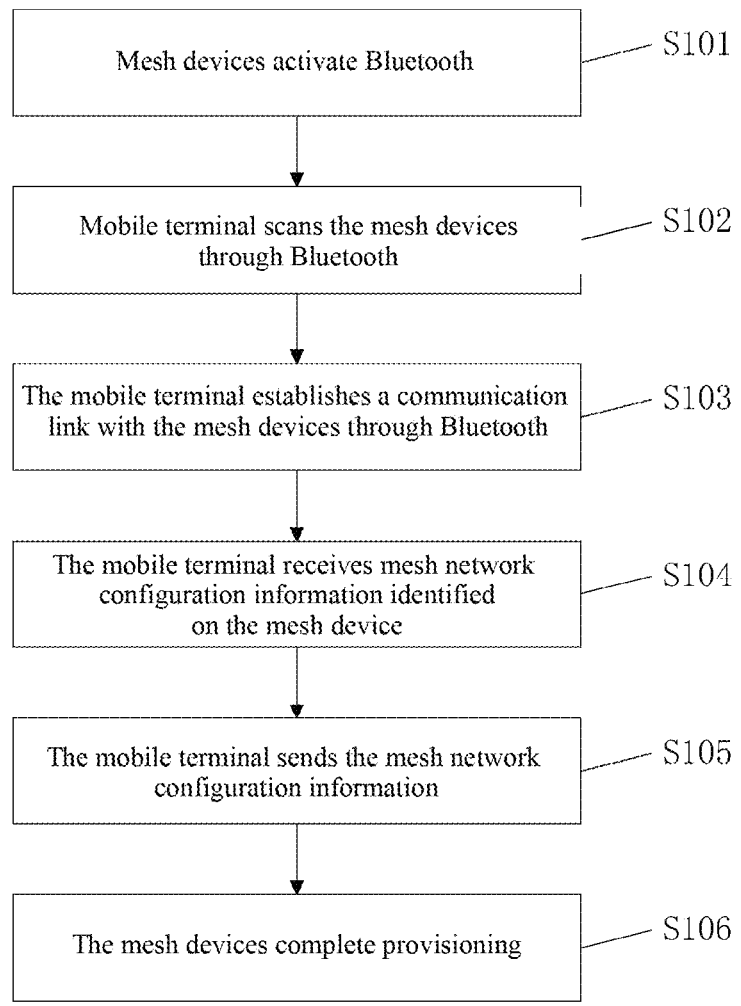
FIG. 1 is a flowchart of a first embodiment of a method for provisioning a mesh network according to the present invention.

As shown in FIG. 1, a first embodiment of a method for provisioning a mesh network is disclosed, which comprises the following steps:

S101) all mesh devices to be provisioned within the preset distance range of the mobile terminal activate Bluetooth. The preset distance range in this embodiment is a Bluetooth communication coverage range of the mobile terminal.

S102) the mobile terminal scans one or more mesh devices within the Bluetooth coverage range thereof through Bluetooth. The mobile terminal may include intelligent mobile devices such as smart phones, tablets, notebook computers, and on-board computers.

S103) the mobile terminal establishes a communication connection with the mesh devices which need provisioning, through Bluetooth.

S104) the mobile terminal receives the mesh network configuration information. Alternatively, this step may be executed before S101 or in parallel with S101.

The mobile terminal may acquire the mesh network configuration information by means of: the mesh network configuration information being preset with a mesh provisioning APP pre-installed on the mobile terminal, or the mesh network configuration information being downloaded from a cloud by the mobile terminal, or the mesh network configuration information being acquired by the mobile terminal through scanning or inputting the text or identification code pattern identified on the mesh device.

The mesh network configuration information may include an ID of the mesh network; an SSID, a channel and a password of a router; and a maximum number of connections supported by and a password of each SoftAP.

S105) the mobile terminal sends the mesh network configuration information to all the mesh devices to be provisioned within the Bluetooth coverage range, sequentially or simultaneously.

S106) the mesh devices receive the mesh network configuration information and complete provisioning.

Figure 2:
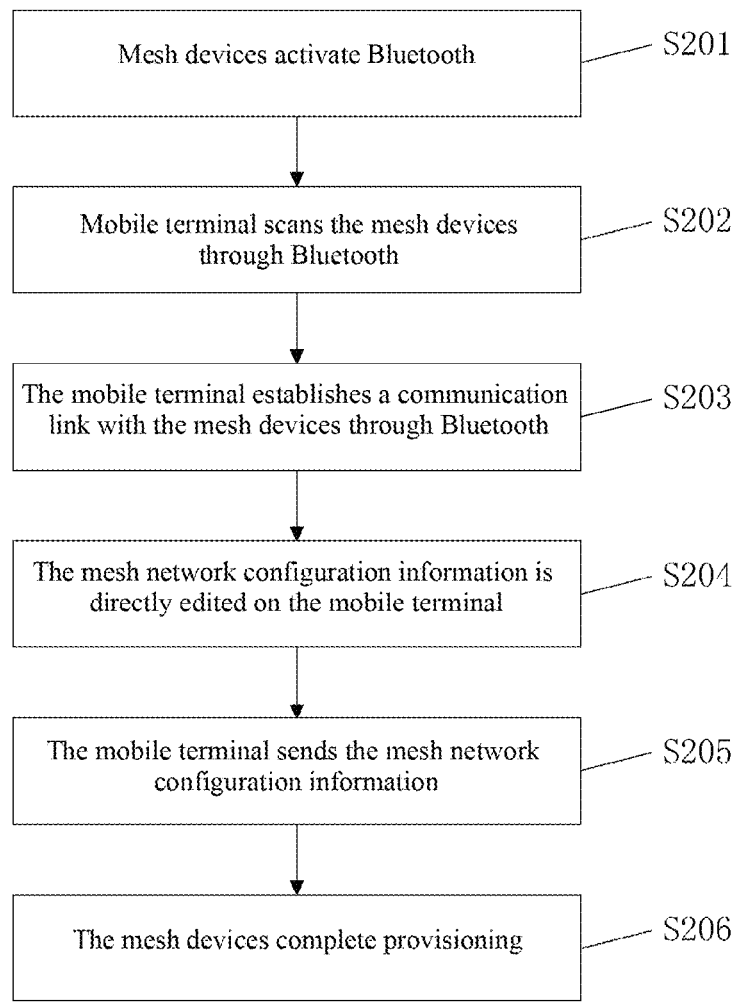
FIG. 2 is a flowchart of a second embodiment of a method for provisioning a mesh network according to the present invention.

As shown in FIG. 2, a second embodiment of a method for provisioning a mesh network is also disclosed, which includes the following steps:

S201) all mesh devices to be provisioned within the preset distance range of the mobile terminal activate Bluetooth. The preset distance range in this embodiment is the Bluetooth communication coverage range of the mobile terminal.

S202) the mobile terminal scans one or more mesh devices within the Bluetooth coverage range thereof through Bluetooth. The mobile terminal may include intelligent mobile devices such as smart phones, tablets, notebook computers, and on-board computers.

S203) the mobile terminal establishes a communication connection with the one or more mesh devices which need provisioning, through Bluetooth.

S204) the mobile terminal receives the mesh network configuration information set by a user for each mesh device or several mesh devices as desired.

The mesh network configuration information includes an ID of the mesh network; an SSID, a channel and a password of a router; and a maximum number of connections supported by and a password of each SoftAP.

S205) the mobile terminal sends the mesh network configuration information to all the mesh devices to be provisioned within the Bluetooth coverage range, sequentially or simultaneously.

S206) the mesh devices receive the mesh network configuration information to complete provisioning.

Figure 3:
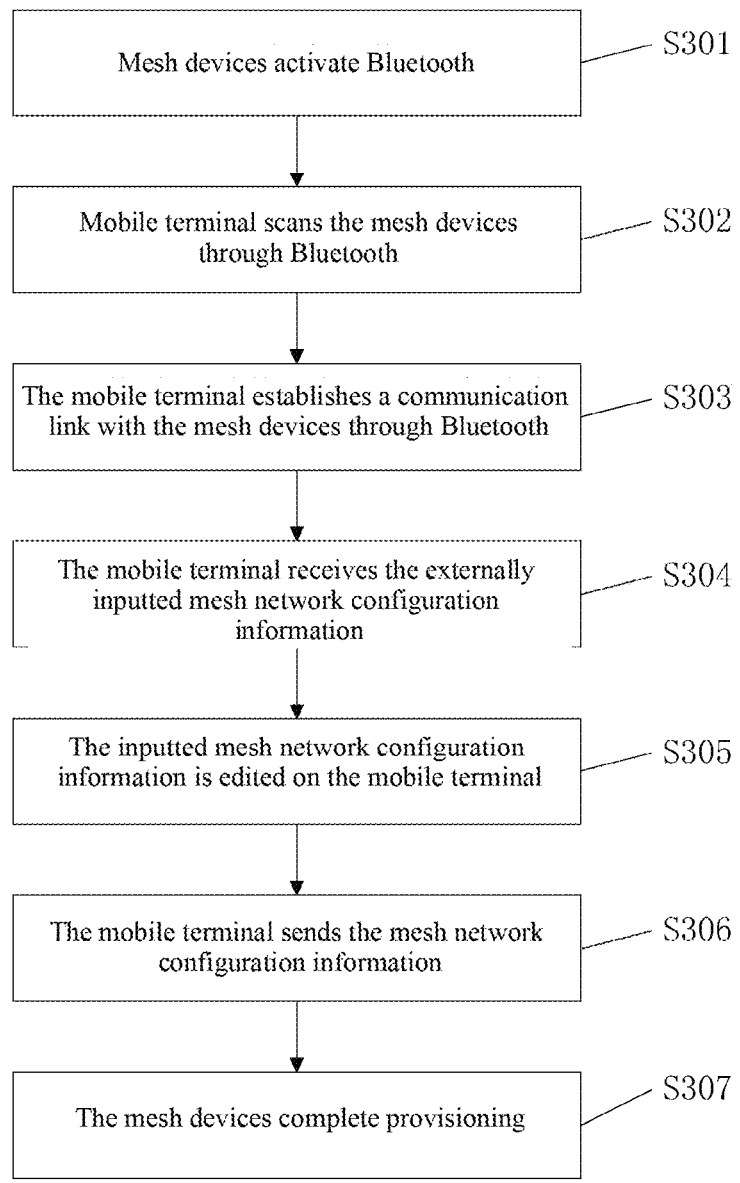
FIG. 3 is a flowchart of a third embodiment of a method for provisioning mesh network according to the present invention.

As shown in FIG. 3, a third embodiment of a method for provisioning a mesh network is also disclosed, the provisioning method particularly including the following steps:

S301) all the mesh devices to be provisioned within the preset distance range of the mobile terminal activate Bluetooth. The preset distance range in this embodiment is the Bluetooth communication coverage range of the mobile terminal.

S302) the mobile terminal scans one or more mesh devices in its Bluetooth coverage area through Bluetooth. The mobile terminal may include intelligent mobile devices such as smart phones, tablets, notebook computers, and on-board computers.

S303) the mobile terminal establishes communication connection with the mesh devices which need the provisioning through Bluetooth.

S304) the mobile terminal receives the mesh network configuration information which is preset by the mesh provisioning APP, or downloaded from a cloud, or identified on the mesh device, or provided remotely by a supplier.

The mesh network configuration information includes an ID of the mesh network; an SSID, a channel and a password of a router; and a maximum number of connections supported by and a password of each SoftAP.

S305) after receiving the mesh network configuration information, if it determines that the externally inputted mesh network configuration information is incorrect or does not meet the current mesh provisioning requirements, the mobile terminal edits and modifies the inputted mesh network configuration information through the mesh provisioning APP.

S306) the mobile terminal sends the mesh network configuration information to all the mesh devices to be provisioned within the Bluetooth coverage range, sequentially or simultaneously.

S307) the mesh devices receive the mesh network configuration information to complete provisioning.

The present invention also discloses a mesh network applicable to the above disclosed provisioning method, which comprises a mobile terminal and a plurality of mesh devices that communicatively connect with the mobile terminal.

The mesh device is provided with a first Bluetooth module for realizing communication with external devices through Bluetooth, which receives the mesh network configuration information through Bluetooth to complete provisioning.

Further, the mesh device is identified with the mesh network configuration information adapted thereto. The identification means of mesh network configuration information includes: indicating the mesh network configuration information on the mesh device; or providing an identification code pattern on the mesh device and obtaining the mesh network configuration information through recognizing the identification code pattern.

The mobile terminal may be embodied as intelligent mobile devices such as smart phones, tablets, notebook computers, and on-board computers. The mobile terminal includes: a mesh network configuration information receiving module and/or editing module, and a second Bluetooth module. The mobile terminal is used to send the mesh network configuration information simultaneously or sequentially to all the mesh devices to be provisioned, through Bluetooth, so that the mesh devices can complete provisioning.

After scanning, the mobile terminal establishes communication connections through Bluetooth, with all the mesh devices that need to be identified within the Bluetooth coverage range, for receiving and/or editing the mesh network configuration information and sending it to the mesh devices.

Further, the mesh network configuration information receiving module and/or editing module of the mobile terminal acquire the mesh network configuration information in the following ways:

receiving the mesh network configuration information by direct manual input;

or providing an identification code pattern scanning device on the mobile terminal, and obtaining the mesh network configuration information through scanning the identification code pattern on the mesh device by the mobile terminal;

or downloading the mesh network configuration information corresponding to the mesh device from a remote network directly;

or pre-storing the mesh network configuration information in the mesh network configuration information receiving module and/or editing module.

Furthermore, the mesh network may adopt a net structure, a tree structure, a star topology structure, a ring topology structure, or a bus topology structure.

The present invention also discloses a mesh device suitable for the above-mentioned provisioning method; the mesh device has its specific use function and network function, and also includes a first Bluetooth module and a mesh provisioning module connecting with the first Bluetooth module.

The first Bluetooth module communicatively connect with the mobile terminal through Bluetooth for receiving the mesh network configuration information sent by the mobile terminal.

The mesh provisioning module communicatively connects with the first Bluetooth module, receives the mesh network configuration information through the first Bluetooth module, and completes provisioning of the mesh device according to the mesh network configuration information.

Preferably, the mesh device is also provided with the corresponding mesh network configuration information. The identification means of the mesh network configuration information includes: indicating the mesh network configuration information on the mesh device; or providing the identification code pattern on the mesh device and obtaining the mesh network configuration information by recognizing the identification code pattern.

Furthermore, authentication information of the mesh device may be stored by the identification code pattern; and the mobile terminal may realize anti-counterfeiting authentication of the mesh device by scanning the identification code pattern.

It should be understood by those skilled in the art that the above embodiments may be provided as methods, devices, or computer program products. These embodiments may take the form of complete hardware embodiments, complete software embodiments, or embodiments in combination with software and hardware aspects. All or some of the steps in the methods described in the above embodiments may be implemented by instructing the related hardware through the program that can be stored in a storage medium readable by a computer device for executing all or some of the steps described in the methods of the above embodiments.

The above embodiments are described with reference to flow charts and/or block diagrams of the methods, devices (systems), and computer program products described in accordance with the embodiments. It should be understood that each flow and/or block in a flowchart and/or block diagram, as well as the combination of the flow and/or block in a flowchart and/or block diagram, may be implemented by computer program instructions. These computer program instructions may be provided to a processor of a computer device to produce a machine such that the instructions executed by the processor of the computer device may produce a device for implementing functions specified in one flow or more flows in the flow chart and/or in one block or more blocks in the block diagram.

Although the content of the present invention has been described in detail through the above preferred embodiments, it should be recognized that the above description should not be considered as limiting the invention. After being read by those skilled in the art, various modifications and substitutions to the present invention will be apparent. Therefore, the protection scope of the present invention should be limited by the appended claims.

The invention claimed is:

1. A method for provisioning a Wi-Fi mesh network, wherein the method comprises:
    a mobile terminal receiving Wi-Fi mesh network configuration information for connecting to a router;
    the mobile terminal scanning one or more mesh devices within a preset distance range thereof through Bluetooth;
    the mobile terminal communicatively connecting with the one or more mesh devices through Bluetooth and sending the Wi-Fi mesh network configuration information to the one or more mesh devices through Bluetooth without forming a Wi-Fi mesh network with the one or more mesh devices, and the one or more mesh devices completing provisioning to connect to the router with the Wi-Fi mesh network configuration information via the Wi-Fi mesh network.

2. The method for provisioning a Wi-Fi mesh network according to claim 1, wherein before the mobile terminal scans the one or more mesh device, all mesh devices to be provisioned within the preset distance range activate Bluetooth, and the mobile terminal scans and communicatively connect with the one or more mesh device through Bluetooth.

3. The method for provisioning a Wi-Fi mesh network according to claim 1, wherein before the mobile terminal sends the Wi-Fi mesh network configuration information to the one or more mesh device, the mobile terminal receives and/or edits the Wi-Fi mesh network configuration information.

4. The method for provisioning a Wi-Fi mesh network according to claim 1, wherein the mobile terminal sends the Wi-Fi mesh network configuration information, sequentially or simultaneously, to all the mesh devices to be provisioned within the preset distance range.

5. The method for provisioning a Wi-Fi mesh network according to claim 1, wherein the preset distance range is a coverage range of Bluetooth.

6. The method for provisioning a Wi-Fi mesh network according to claim 1, wherein the Wi-Fi mesh network configuration information includes an ID of the Wi-Fi mesh network; an SSID, a channel and a password of the router; and a maximum number of connections supported by and a password of each SoftAP.

7. A Wi-Fi mesh network suitable for the method for provisioning a Wi-Fi mesh network according to claim 1, wherein the Wi-Fi mesh network comprises:
    a mobile terminal which receives and/or edits Wi-Fi mesh network configuration information for connecting to a router and sends out the Wi-Fi mesh network configuration information; and
    one or more mesh devices which communicatively connect with the mobile terminal through Bluetooth and receive the Wi-Fi mesh network configuration information through Bluetooth to complete provisioning to connect to the router with the Wi-Fi mesh network configuration information via the Wi-Fi mesh network.

8. The Wi-Fi mesh network according to claim 7, wherein each of the one or more mesh devices comprises a first Bluetooth module, which communicatively connects with the mobile terminal through Bluetooth.

9. The Wi-Fi mesh network according to claim 7, wherein the mobile terminal comprises a Wi-Fi mesh network configuration information receiving module and/or editing module, and a second Bluetooth module.

10. A mesh device suitable for the method for provisioning a Wi-Fi mesh network according to claim 1, wherein the mesh device comprises:
    a first Bluetooth module which communicatively connects with the mobile terminal through Bluetooth and receives the Wi-Fi mesh network configuration information through Bluetooth;
    a mesh provisioning module which completes provisioning according to the Wi-Fi mesh network configuration information.

* * * * *